(12) United States Patent
Bengtsson et al.

(10) Patent No.: US 10,990,945 B2
(45) Date of Patent: Apr. 27, 2021

(54) SELF-CHECKOUT SYSTEM

(71) Applicant: ITAB SHOP PRODUCTS AB, Jönköping (SE)

(72) Inventors: Mikael Bengtsson, Skillingaryd (SE); Peter Wärnbring, Bankeryd (SE)

(73) Assignee: ITAB SHOP PRODUCTS AB, Jönköping (SE)

( * ) Notice: Subject to any disclaimer, the term of this patent is extended or adjusted under 35 U.S.C. 154(b) by 145 days.

(21) Appl. No.: 16/316,153

(22) PCT Filed: Jul. 11, 2017

(86) PCT No.: PCT/SE2017/050774
§ 371 (c)(1),
(2) Date: Jan. 8, 2019

(87) PCT Pub. No.: WO2018/013046
PCT Pub. Date: Jan. 18, 2018

(65) Prior Publication Data
US 2020/0286059 A1 Sep. 10, 2020

(30) Foreign Application Priority Data
Jul. 11, 2016 (SE) .................................... 1651030-7

(51) Int. Cl.
*G06Q 20/18* (2012.01)
*G06T 7/70* (2017.01)
(Continued)

(52) U.S. Cl.
CPC .............. *G06Q 20/18* (2013.01); *G06T 7/20* (2013.01); *G06T 7/70* (2017.01); *G07G 1/0036* (2013.01);
(Continued)

(58) Field of Classification Search
CPC ........ G06Q 30/06; G06Q 99/00; G06Q 20/36; G06Q 20/209; G06Q 10/08; G06Q 30/00;
(Continued)

(56) References Cited

U.S. PATENT DOCUMENTS 5,013,896 A * 5/1991 Ono ........................ A47F 9/048
235/375
5,992,570 A * 11/1999 Walter .................... A47F 9/048
186/36
(Continued)

FOREIGN PATENT DOCUMENTS

EP 1014319 A2 6/2000
EP 1014319 A3 5/2006
(Continued)

OTHER PUBLICATIONS

Extended Search Report for European Patent Application No. 17828069.9 dated Jan. 21, 2020.
(Continued)

*Primary Examiner* — Olusegun Goyea
(74) *Attorney, Agent, or Firm* — Thompson Coburn LLP

(57) ABSTRACT

A self-checkout system for controlling an exit of a checkout area (110) is provided. The system comprises a sensor arrangement (120) comprising at least one sensor (140), wherein the sensor arrangement (120) is configured to track, by the at least one sensor (140), a person being inside the checkout area (110), receive a payment signal confirming a successful payment by a person (1), receive an exit detection signal, from the at least one sensor (140) representing that a person (1) is at a predetermined distance from the exit in the checkout area (110), and determine if the exit detection signal and the payment signal correspond to the same person (1), and if so transmit an opening signal to said exit so that said person (1) is allowed to exit the area (110).

13 Claims, 7 Drawing Sheets

(51) Int. Cl.
*G06T 7/20* (2017.01)
*G07G 1/00* (2006.01)
*G07G 3/00* (2006.01)
*H04N 7/18* (2006.01)

(52) U.S. Cl.
CPC ............... *G07G 3/003* (2013.01); *H04N 7/18* (2013.01); *G06T 2207/30196* (2013.01)

(58) Field of Classification Search
CPC .......... G06Q 20/20; G06Q 20/32; G08B 1/08; G08B 13/14; G06K 15/00; G06K 9/00
USPC ....... 235/382, 383, 375, 376, 380, 381, 385; 186/36, 37, 61; 705/26.1, 7.29, 17, 16, 705/26.7
See application file for complete search history.

(56) References Cited

U.S. PATENT DOCUMENTS

| | | | | |
|---|---|---|---|---|
| 6,769,610 | B2* | 8/2004 | Habara | G06Q 20/24 235/380 |
| 7,076,441 | B2* | 7/2006 | Hind | G06Q 10/087 705/7.29 |
| 7,143,938 | B2* | 12/2006 | Hammerle | A47F 9/04 235/383 |
| 8,106,775 | B2* | 1/2012 | Ohkawa | G07G 3/006 340/572.1 |
| 9,082,114 | B2* | 7/2015 | Colley | G06Q 20/18 |
| 9,741,241 | B2* | 8/2017 | Mizui | H04N 1/00323 |
| 2004/0133474 | A1* | 7/2004 | Tami | G06Q 30/02 705/16 |
| 2007/0294207 | A1 | 12/2007 | Brown et al. | |
| 2008/0189170 | A1* | 8/2008 | Ramachandra | G06Q 30/02 705/7.29 |
| 2008/0249837 | A1 | 10/2008 | Angell et al. | |
| 2011/0320322 | A1 | 12/2011 | Roslak et al. | |
| 2013/0073405 | A1* | 3/2013 | Ariyibi | G06Q 30/0261 705/17 |
| 2014/0172610 | A1* | 6/2014 | Carpenter | G06Q 20/40 705/26.1 |
| 2015/0039458 | A1* | 2/2015 | Reid | G06K 9/00771 705/26.1 |
| 2015/0041535 | A1* | 2/2015 | Daily | A47F 9/047 235/381 |
| 2015/0206121 | A1 | 7/2015 | Joseph et al. | |
| 2017/0068945 | A1* | 3/2017 | Tsuchimochi | G06Q 30/06 |
| 2017/0200152 | A1* | 7/2017 | Winkler | G06Q 20/204 |
| 2017/0316271 | A1* | 11/2017 | Saitou | G07G 1/0036 |
| 2018/0240180 | A1* | 8/2018 | Glaser | G06K 9/00771 |
| 2019/0114488 | A1* | 4/2019 | Glazer | G06Q 20/208 |
| 2019/0333039 | A1* | 10/2019 | Glaser | G06Q 20/208 |
| 2020/0134590 | A1* | 4/2020 | Glaser | G06Q 20/085 |
| 2020/0184445 | A1* | 6/2020 | Biggs | G06Q 20/3821 |

FOREIGN PATENT DOCUMENTS

| | | | |
|---|---|---|---|
| EP | 1717772 A1 | 11/2006 | |
| JP | 2009009231 A * | 1/2009 | ............... G07G 1/12 |
| JP | 2009009231 A | 1/2009 | |
| JP | 2012243082 A | 12/2012 | |
| JP | 2017199234 A * | 11/2017 | ......... G06K 9/00771 |
| WO | 2014128624 A1 | 8/2014 | |

OTHER PUBLICATIONS

International Preliminary Report on Patentability for PCT/SE2017/050774 dated Nov. 11, 2018.
International Search Report and Written Opinion for PCT/SE2017/050774 dated Sep. 25, 2017.

* cited by examiner

SELF-CHECKOUT SYSTEM

CROSS-REFERENCE TO RELATED APPLICATIONS

This application is a national stage application of International Patent Application No. PCT/SE2017/050774, published as WO2018/013046, which was filed on Jul. 11, 2017, which claims priority to Swedish Patent Application No. 1651030-7, filed Jul. 11, 2016, the disclosures of which are incorporated by reference herein.

TECHNICAL FIELD

The present invention relates to a self-checkout system for controlling an exit of a checkout area.

BACKGROUND

In today's stores many different articles, such as food products, hygiene articles, clothing, textures, etc. may be purchased which all have different sizes and shapes. Normally, a checkout operator handles each article manually and makes sure that the article is associated with the correct pricing at checkout for payment by the customer. This is traditionally done either by manually inputting the price, by scanning a barcode attached to the article, or a combination of those. However, automatic checkout counters are becoming an interesting alternative for retail stores and supermarkets. Such checkout counters provides safe and easy handling of articles and they normally include different components for identifying the article accurately.

In order to prevent customer from taking articles outside the store without paying for the item, the store and/or articles therein may be part of a surveillance system. The surveillance system may include a security tag that is removable attached to the article and/or the shopping areas are equipped with gates for allowing or preventing customers from entering or exiting the shopping areas through the gates. For example, automatic checkout counters may be equipped with exit gates which may be closed during the purchase, and opened only when the customer scans the receipt after payment. Consequently the gate opens upon purchase verification and is returned to its closed position immediately after.

Having to scan the receipt in order to get out has several drawbacks. The customer may be carrying several bags with his/hers purchased items and thus having difficulties in scanning the receipt without having to put down the bags to the ground. Secondly, the customer may have thrown away the receipt or, where it is possible, have chosen not to be given a receipt.

An important aspect of automatic checkout counters is to improve the user experience while still remaining high security levels. Therefore, there is a need for an improved store exit system that prevents or at least decreases the risk of stealing while at the same time being easy and convenient for the costumer.

SUMMARY

An object of the present invention is to provide a system which automatically opens an exit for costumers that have paid for their article(s).

According to a first aspect, a self-checkout system for controlling an exit of a checkout area is provided. The system comprises a sensor arrangement comprising at least one sensor, wherein the sensor arrangement is configured to track, by the at least one sensor, a person being inside the checkout area, receive a payment signal confirming a successful payment by a person, receive an exit detection signal from the at least one sensor representing that a person is at a predetermined distance from the exit in the checkout area, and determine if the exit detection signal and the payment signal correspond to the same person, and if so transmit an opening signal to said exit so that said person is allowed to exit the area.

The system tracks the person in the designated area without identifying his/hers identity. This is beneficial since the identity of the person is not saved and problems concerning personal integrity and storing such information are avoided.

In one embodiment, the sensor arrangement is further configured to, prior to the step of receiving a payment signal, receive a first detection signal representing the detected person entering the checkout area and assign a unique identification value to said person based on the first detection signal.

In an alternative embodiment, the sensor arrangement is further configured to, after the step of receiving a payment signal, receive a first detection signal representing the detected person entering the checkout area and assign a unique identification value to the person based on the first detection signal.

In a preferred embodiment the unique identification value is not coupled to the identity of the person being tracked.

The step of determining if the exit detection signal and the payment signal correspond to the same person may be performed by determining if the exit detection signal matches the unique identification value.

In one embodiment, the unique identification value may be saved once the payment signal is received. In this way all identification values that are saved represents persons that has already paid for its articles and who is allowed to pass though the exit. This saves memory space in the sensor arrangement and thus reduces production costs.

In an alternative embodiment, the unique identification value is saved once it is assigned, wherein the unique identification value is updated with the payment information contained in said payment signal once a payment signal is received.

The exit may comprise at least one passage gate and wherein the sensor arrangement is configured to transmit an opening signal to the passage gate so as to open the gate. The at least one passage gate will thus be automatically opened for all paying costumers, thus providing a high user experience.

According to a second aspect, a method for controlling an exit of a checkout area is provided. The method comprises the steps of tracking a person being inside the checkout area, completing a payment transaction for a person, detecting that said person is at a predetermined distance from the exit, and determining if the person that completed the payment transaction is the same person that was detected at a predetermined distance from the exit, and if so opening the exit so that said person is allowed to exit.

In one embodiment, the method further comprises the steps of, prior to the step of completing a payment transaction, detecting a person entering the checkout area, and assigning a unique identification value to said person.

In an alternative embodiment, the method further comprises the steps of, after the step of completing a payment transaction, detecting a person entering the checkout area, and assigning a unique identification value to said person.

The step of determining if the person that completed the payment transaction is the same person that was detected at a predetermined distance from the exit may be performed by determining if the unique identification value refers to the person detected at a predetermined distance from the exit.

BRIEF DESCRIPTION OF THE DRAWINGS

Embodiments of the invention will be described in the following; reference being made to the appended drawings which illustrate non-limiting examples of how the inventive concept can be reduced into practice.

DETAILED DESCRIPTION OF EMBODIMENTS

Figure 1:
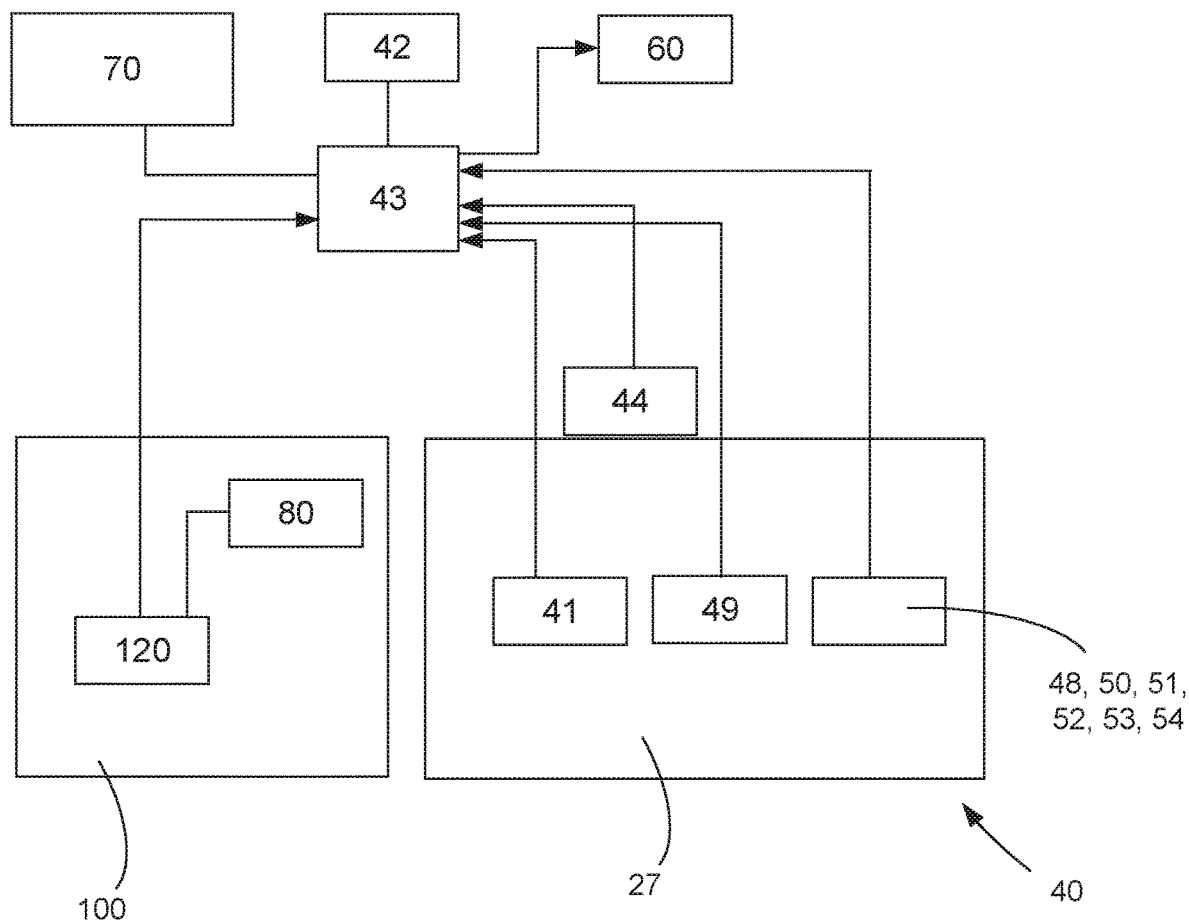
FIG. 1 shows a top view of a checkout system according to an embodiment of the present invention.

An example of an automatic checkout system will now be described in reference to FIG. 1 showing an automatic checkout counter comprising a classification device 40 on which the article are automatically identified arranged on a counter 27 on which articles may be placed by a customer and a point-of-sale system 70 for completing a transaction based on the articles identified by the classification device 40. The system further comprises a surveillance system 100 configured to open and close a passage gate 80 for a customer once his/hers transaction is completed. The surveillance system 100 comprises a sensor arrangement 120 that is in communication with the passage gate 80 and the point-of-sale system 70. The surveillance system 100 will be described more in detail with reference to FIG. 3 to 6.

According to an embodiment, the classification device 40 comprises a bar code reader 49 for identifying the article, being incorporated in the counter 27, a memory unit 42 comprising information of one or more articles, a processor 43 connected to the memory unit 42 and to the bar code reader 49, and at least one spectroscopy sensor 44, from here on denoted as a NIR or a VIS sensor 44 depending on the associated wavelength interval, connected to the processor 43. The NIR and/or VIS sensor may be arranged at a lateral end of the counter 27 and is facing towards the articles passing.

The counter 27, including the barcode reader 49, is configured to identify the article and transmit such information to the processor 43. The bar code reading system 49 may comprise one or more readers. One reader 49 may be arranged at a lateral end of the counter 27 thus scanning inwards towards the articles passing. Further, additional bar code readers for creating a complete coverage of the articles may be provided. Hence, an upper, lower, left, right, front, and back side of the article could thus be scanned by the readers. In a particular embodiment, a bar code reader is positioned under a slit in the counter 27 and scanning upwards, such that a bar code becomes visible when it is arranged on the counter 27.

The NIR or VIS sensor 44 detects a reflection spectrum from an article, whereby the processor 43 is configured to match the measured reflection spectrum with a database of reference spectrums, whereby each reference spectrum is associated with a unique article identity. Hence, different articles will provide a unique reflection spectrum whereby an accurate identification may be achieved for articles not carrying a bar code.

The NIR or VIS sensor 44 must thus be capable of detecting the reflection spectrum for a wide variety of articles having different dimensions. For example, such articles include both small packages of socks as well as larger articles, such as a jacket, a pair of jeans, etc. In order to be able to measure such reference spectrum in a reliable manner the NIR or VIS sensor 44 is preferably arranged on a support, which support is configured to be moveable such that the NIR or VIS sensor 44 may be directed towards the article passing. Hence, a first sensor, such as a camera, is configured to provide information corresponding to the dimensions of the article. The information is transmitted to the processor 43, which then calculates a correct angle of the NIR or VIS sensor 44, i.e. an angle relative the horizontal plane. If the article is very small, such as the pair of socks, the NIR or VIS sensor 44 is directed towards the counter 27, i.e. downwards. Should the article be large, such as a pair of jeans, the NIR or VIS sensor 44 will be directed upwards.

As already discussed briefly above, the memory unit 42 comprises one or more digital signatures created by the at least one spectroscopy sensor 44, wherein each one of said signatures is associated to a corresponding article identity. A benefit of the classification device 40 is that the checkout counter automatically may identify all sorts of articles without any need for the customer to identify the article before the checkout counter, e.g. with a barcode. The NIR or VIS sensor 44 is particularly valuable for identifying fruit and vegetables, and certain types of bulk articles, since these articles have previously required the customer to mark the article with a bar code due to the fact that sensors using cameras and image processing have not been able to determine the article identity accurately enough.

Having both NIR or VIS sensor 44 and a barcode reader 49 has the advantage of preventing fraud, in case a customer tries to replace the barcode of an expensive article with a barcode of a cheap article. For example, should a barcode of a cheap pair of gloves be placed on an expensive suit, the NIR or VIS sensor 44 may in fact be used to compare the reflection spectrum of the article with stored reference spectrum stored in the memory 42. Hence, such fraud will be detected and an alarm may be triggered.

The identity of the article may be determined by matching a measured signature to a database comprising properties of a plurality of articles. The database may be stored in the memory unit 42 and examples of properties are reflection spectrum, weight, size, color, shape, contour, barcode patterns and/or text and/or figure and/or pattern.

A display unit 60 may be connected to the processor 43 for displaying at least one article identity. The display unit 60 is preferably arranged for use by a customer for approving the displayed information. If the first NIR or VIS sensor 44 identifies the article, an image or a text is shown in the display unit 60 and if the user finds the displayed information matching the article which presently is in the checkout counter the customer may approve the identity by manual input. Further information may be displayed, e.g. weight and price, wherein the user may approve the displayed information if it is correct.

According to one embodiment the checkout counter may, as a compliment to the first NIR or VIS sensor 44 and the weight sensor 41, be provided with one or several further sensors which, if used according to the invention, brings out the advantage of increasing the security when identifying the article, but with a minimum use of resources and time and energy. It should be mentioned here that an article should preferably be identified in less than one second for an automated checkout counter to be considered as user friendly by the customers.

The classification device 40 may further use a further sensor being selected from the group consisting of: an additional spectroscopy sensor (not shown), a RFID sensor 54, a contour sensor 48, a weight sensor 41, a symbol reading sensor 50, a color texture sensor 51, a color histogram sensor 52, or an object sensor 53. The contour sensor 48, the symbol reading sensor 50, the color texture sensor 51, the color histogram sensor 52, and the object sensor 53 may all be implemented by one or several cameras which are connected to the processor 43, which processor 43 is configured to provide a specific image computing algorithm for extracting the required information from the image.

The weight sensor 41 is a scale configured to detect the weight of the article and transmit such information to the processor 43. This allows for providing a correct pricing for such articles which are priced based on the weight.

Once all the articles of the costumer are correctly identified by the classification device 40, the processor 43 transmits a transaction signal to the point-of-sale system 70 to allow the costumer to finish the payment transaction. The point-of sale system 70 then transmits a control signal to the surveillance system 100 which will be used in the determination whether or not to open the passage gate 80.

The description above describes one example of a classification device. It should however be understood that other types of classification devices, operating on different technologies, could also be possible within the context of this specification.

Figure 2A:
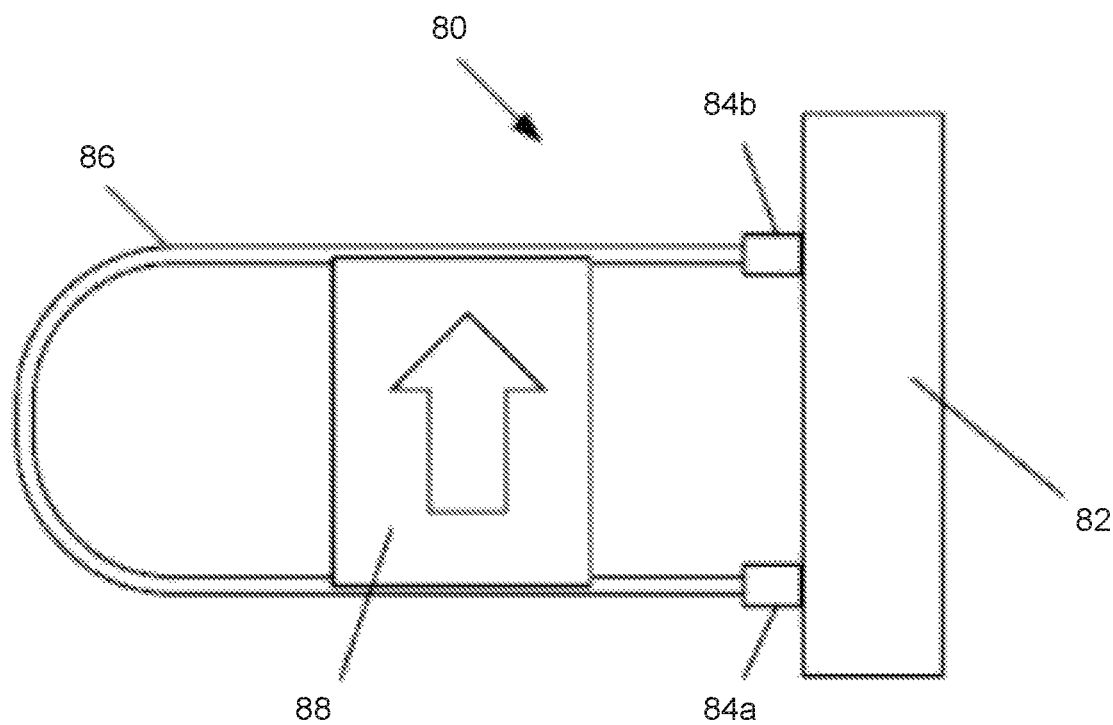
FIGS. 2a-b show a side view and a top view of a passage gate according to an embodiment of the present invention.
Figure 2B:
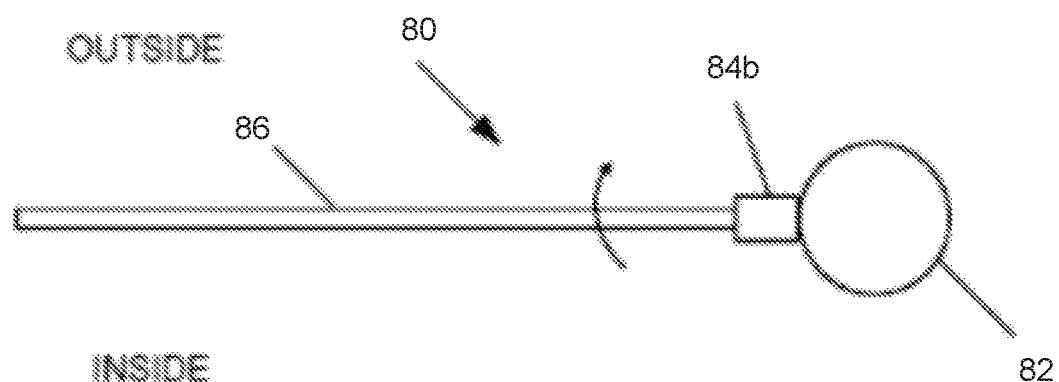

An automatic passage gate 80 is shown in FIG. 2*a-b*. In the embodiment shown in FIG. 2*a-b* the passage gate 80 is configured to be arranged vertically, such that a gate arm 86 extends horizontally outwards from a vertical support 82. The gate arm 86 may e.g. have a shape of a lying U, whereby each leg of the U-shape is connected to the vertical support 82 at joints 84*a*, 84*b*, respectively. It will however be understood that other shapes and configurations of the gate arm are equally possible. Normally, a sign 88 is provided at the gate arm 86 for indicating the opening direction of the gate 80. An embodiment of the passage gate 80 is further illustrated in FIG. 2*b*. As shown by the arrow, the passage gate 80 will open by swinging the gate arm 86 approximately 90° in the direction of the arrow for allowing people to exit the checkout area. The joints 84*a*, 84*b* forms part of a hollow drum (not shown) extending vertically from a lower bracket to an upper bracket. A drive unit is arranged inside the drum, and may houses an electrical motor and a gear box for reducing the rotational speed of the electrical motor. Hence, upon activation of the drive unit a rotation of the electrical motor will cause a corresponding rotational movement of the drum whereby the entry gate 80 opens.

It should be noted that the passage gate 80 shown in FIG. 2*a-b* is just one example of a passage gate that could be used. In one embodiment the passage gate 80 is a gate which opens upwards, i.e. a gate arm will be moved in an upwards direction. In yet another embodiment, the passage gate 80 is a gate which is a sliding gate, i.e. the gate is opened by sliding a door or gate arm from one end to another. The passage gate 80 may also be an ordinary automatic door.

Figure 3:
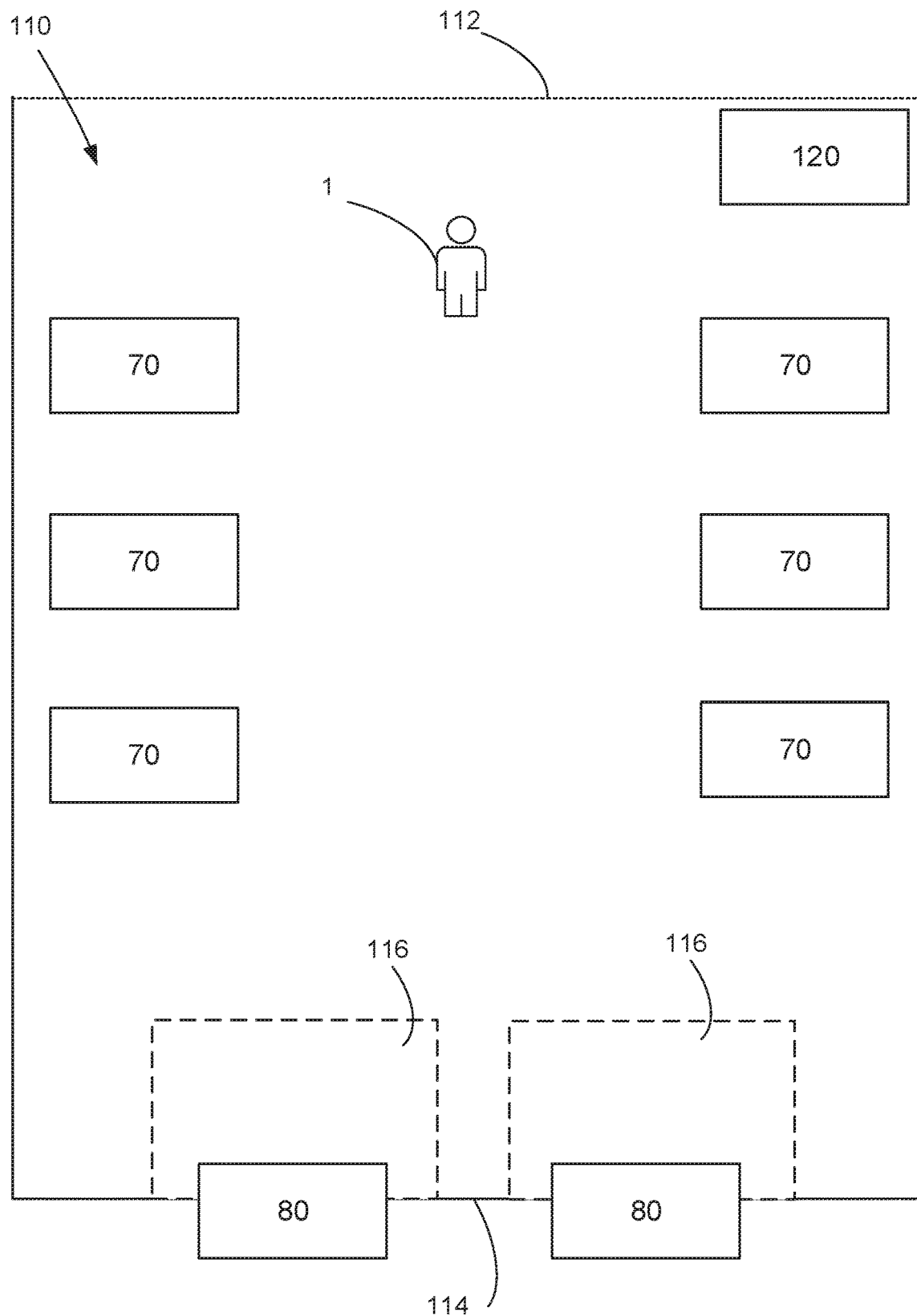
FIG. 3 shows a schematic top view of an automatic checkout system according to an embodiment of the present invention.

At least some parts of the automatic checkout system are arranged inside a designated area 110, as illustrated in FIG. 3. In the area 110 shown in FIG. 3 *e* a plurality of point-of-sale systems 70 for completing a transaction for each person's 1 article(s), two passage gates 80 and a sensor arrangement 120 are arranged. Here the point-of-sale system 70 is illustrated as being separated from the classification device 40, however as should be understood the whole automatic checkout system may be arranged inside the designated area 110.

The designated area 110, such as a checkout area, may be constructed such that the person 1 only is allowed to exit the area through a passage gate 80. Hence, one side 112 of the checkout area 110 may be connected to the rest of the store, thus acting as an entrance passage 112 to the checkout area 110. The entrance passage 112 may be a virtual line or an area that the person has to pass through for the sensor arrangement 120 to register a passage. On the opposite side of the entrance passage 112, the checkout area 110 comprises at least one smaller area 116, here referred to as an exit area 116 arranged in conjunction to the passage gates 80. At least one passage gate 80 is arranged in an exit passage 114, which is incorporated in an exit area 116. If two or more passage gates 80 are present, as seen in FIG. 3, each passage gate 80 may have its own exit area 116 or share one common exit area 116. The checkout area 110 and the exit area may be of any shape and may also be an open area or an enclosed area.

Figure 4:
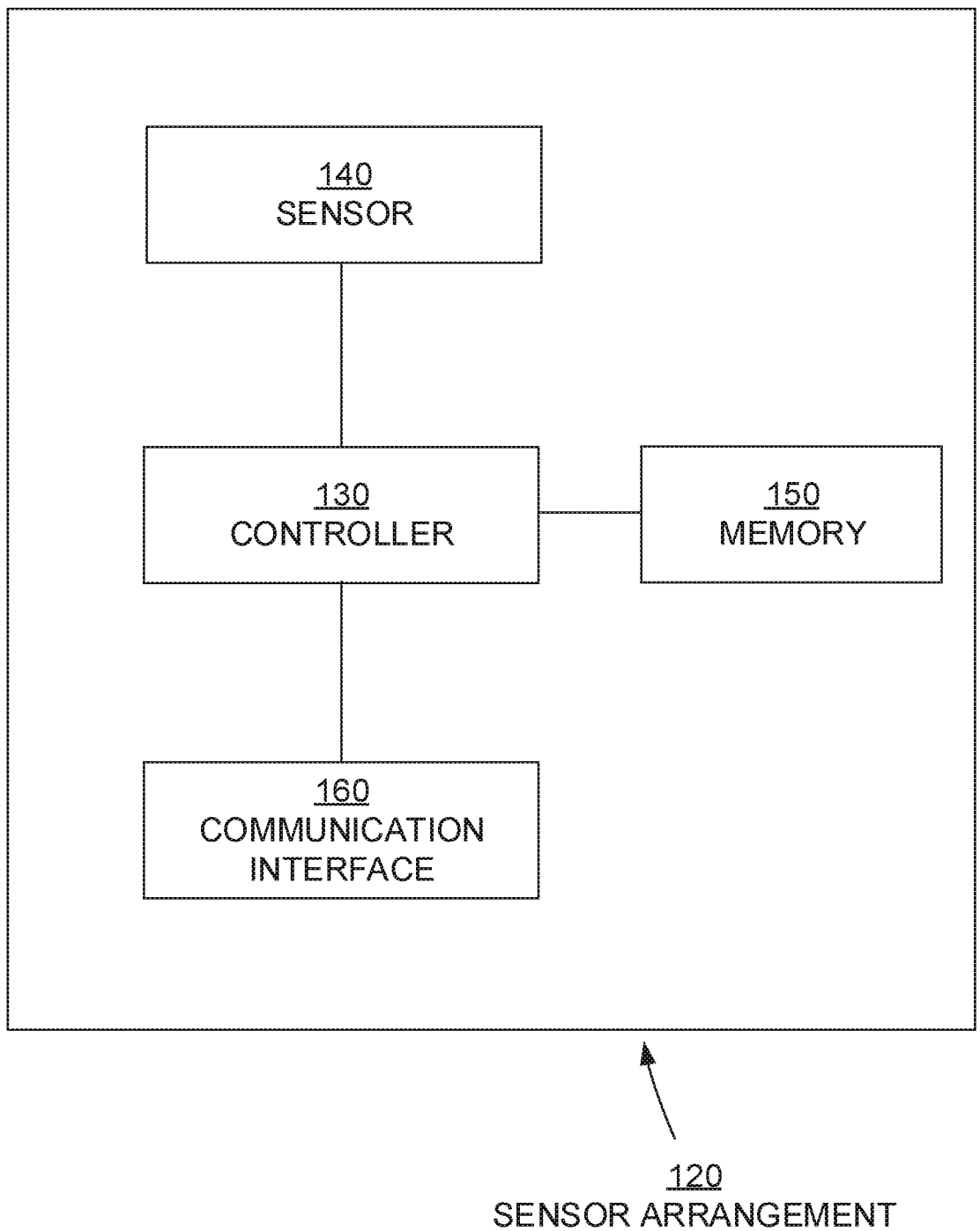
FIG. 4 shows a schematic view of a sensor arrangement in an automatic checkout system according to an embodiment of the present invention.
Figure 5:
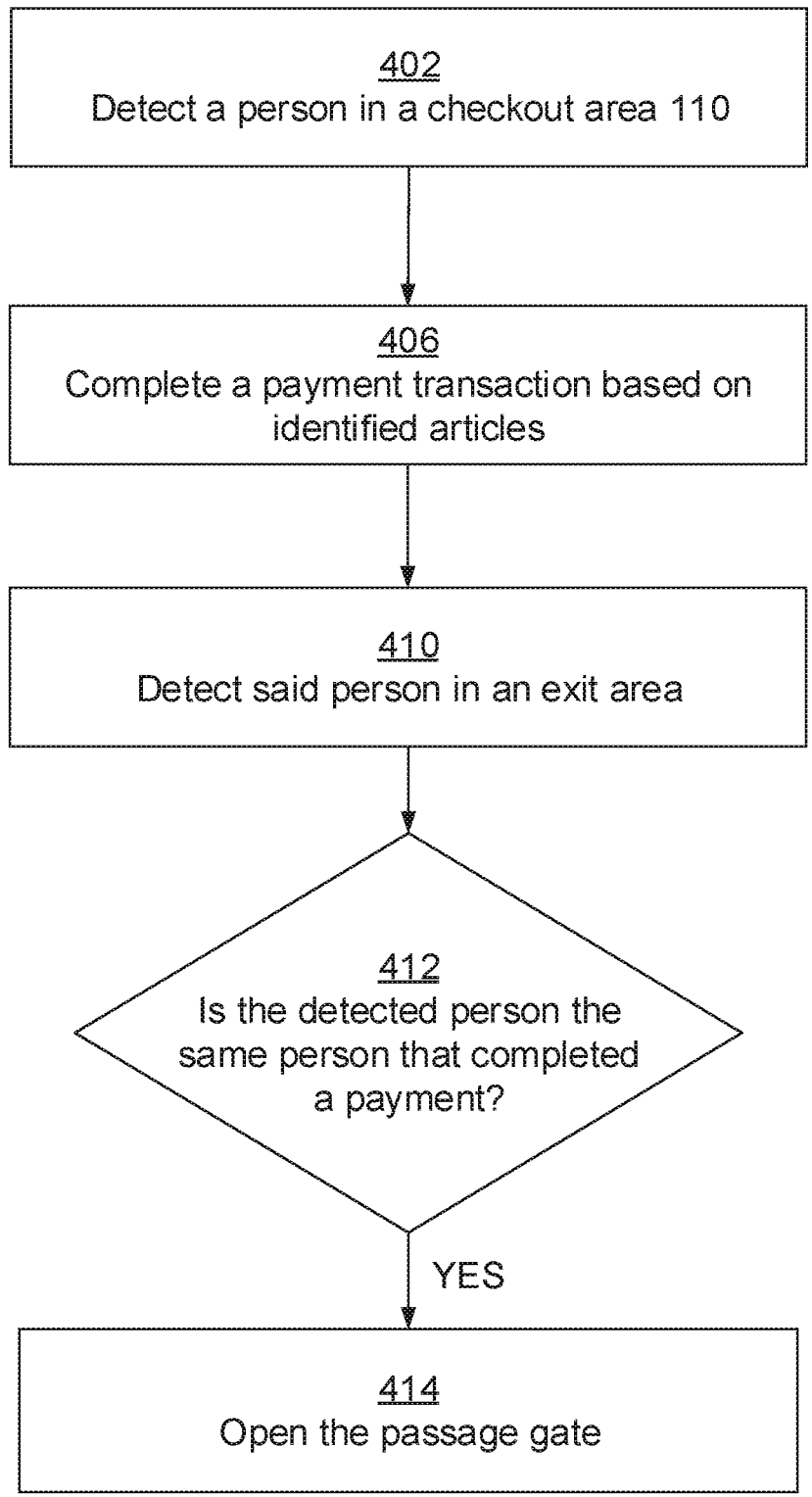
FIG. 5 shows a schematic method of an automatic checkout system according to an embodiment of the present invention.

As seen in FIG. 4, the sensor arrangement 120 comprises at least one sensor 140 which is arranged to detect and/or monitor a movement of a person in the designated area 110. The sensor arrangement 120 is configured to at least detect when a person 1 enters the checkout area 110 and/or when the person 1 is close to or initiates a payment at a point-of-sale system 70. Furthermore, the sensor arrangement 120 is configured to detect when a person 1 enters the exit area 116 near the passage gates 80. Once a person 1 is detected in the checkout area 110, a detection signal is generated.

The sensor arrangement 120 comprises at least one sensor 140. In one embodiment the sensor 140 is a camera configured to capture an image stream, i.e. a series of images captured. The camera 140 may be a digital 3D stereo camera that is arranged to identify, using identification values as will be described more with reference to FIG. 6*a-b*, and track people and also have capability to take video or still images. In another embodiment the at least one sensor 140 uses Kinect sensor technology and/or triangulation solution (indoor navigation) and/or is an ordinary digital surveillance camera.

The sensor arrangement 120 further comprises a controller 130. The controller 130 is connected to (or part of) a sensor 140 to determine if a person is allowed to exit the passage gates 80. It should be noted that the sensor 140 may comprise at least one controller 130 and/or be connected to at least one controller 140 and that the controller 140 may be remote and/or comprised in the sensor 140. The controller 130 is responsible for the overall operation of the sensor arrangement 120 and is preferably implemented by any commercially available CPU ("Central Processing Unit"), DSP ("Digital Signal Processor") or any other electronic programmable logic device. The controller 130 is configured to read instructions from a memory 150 and execute these instructions to control the operation of the sensor(s) 130 and/or the passage gate(s) 80. The memory 150 may be implemented using any commonly known technology for computer-readable memories such as ROM, RAM, SRAM, DRAM, CMOS, FLASH, DDR, SDRAM or some other memory technology. The memory 150 is used for various purposes by the controller 130, one of them being for storing application data and program instructions.

The sensor arrangement 120 may further comprise a communication interface 160, which is adapted to allow the sensor arrangement 120 to communicate with other devices, such as the passage gate 80 or the point-of-sale system 70, through the use of different communication technologies. Such communication technologies may be wired or wireless. Examples of such wired technologies are Universal Serial Bus (USB) and Ethernet to name a few. It should be noted that other technologies exist and are taken to be an obvious equivalent for such wired communication interfaces. Examples of such wireless technologies are IEEE 802.11, IEEE 802.15, ZigBee, WirelessHART, WIFI, Bluetooth®, W-CDMA/HSPA, GSM, UTRAN and LTE to name a few. It should be noted that other technologies exist and are taken to be an obvious equivalent for such wireless communication interfaces 160.

A person is only allowed to exit through the gate(s) 80 of the store if the person has paid for its article(s). This is determined based on information from the sensor arrangement 120 and information regarding the payment as will now be described with reference to FIG. 5 and FIG. 6a-b. The automatic checkout system is configured to detect 402 a person in a designated area, such as a checkout area 110, complete 406 a payment transaction based on identified articles and detect 410 when the person enters an exit area 116 in the designated area. If 412 the detected person is the same person that completed the payment transaction, a passage gate 80 is opened 414 so that the person may leave the store.

In one embodiment, the sensor arrangement 120 continuously tracks a person in at least a part of the designated area 110 by the use of at least one sensor 140. The sensor arrangement 120 receives a first detection signal, from the at least one sensor 140, that represents that the detected person has entered the designated area 110. The sensor arrangement 120 then receives a payment signal, from a point-of-sale system 70, that confirms a successful payment by the detected person. When the person is at a predetermined distance from the exit in the designated area 110, the sensor arrangement 120 receives an exit detection signal from the at least one sensor 130. If a payment signal and an exit detection signal is received, the arrangement 120 determines if the exit detection signal and the payment signal correspond to the same person 1. If so, the sensor arrangement 120 transmits an opening signal to the exit so that the person is allowed to exit the area 110. The determination if the if the exit detection signal and the payment signal correspond to the same person 1 may also be seen as verifying that the person being tracked has in fact paid.

Preferably, the control unit 130 of the sensor arrangement 120 is configured to receive the first detection signal, receive the payment signal, receive the exit detection signal, determined if the signal correspond to the same person and transmit the opening signal.

Figure 6A:
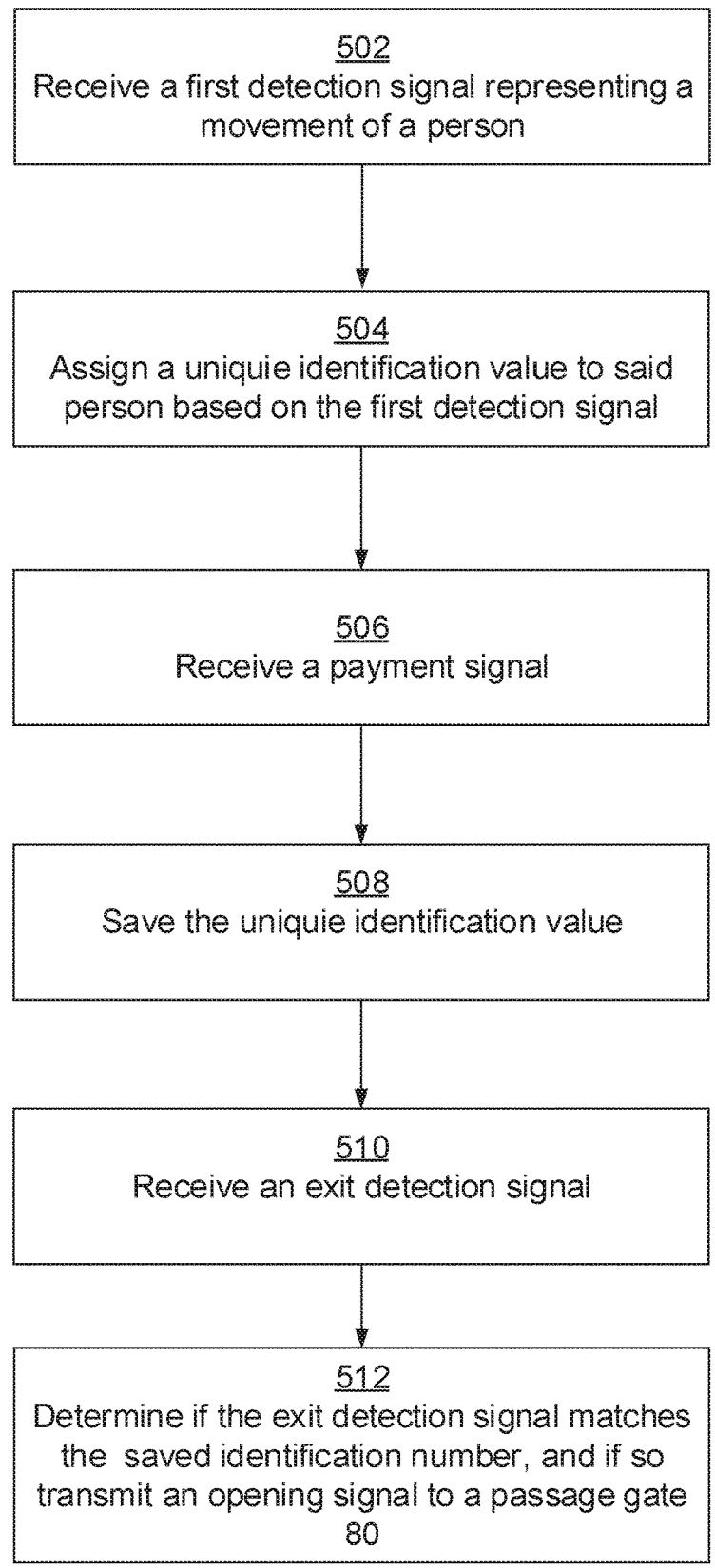
FIGS. 6a-b show a schematic method of a sensor arrangement in an automatic checkout system according to an embodiment of the present invention.
Figure 6B:
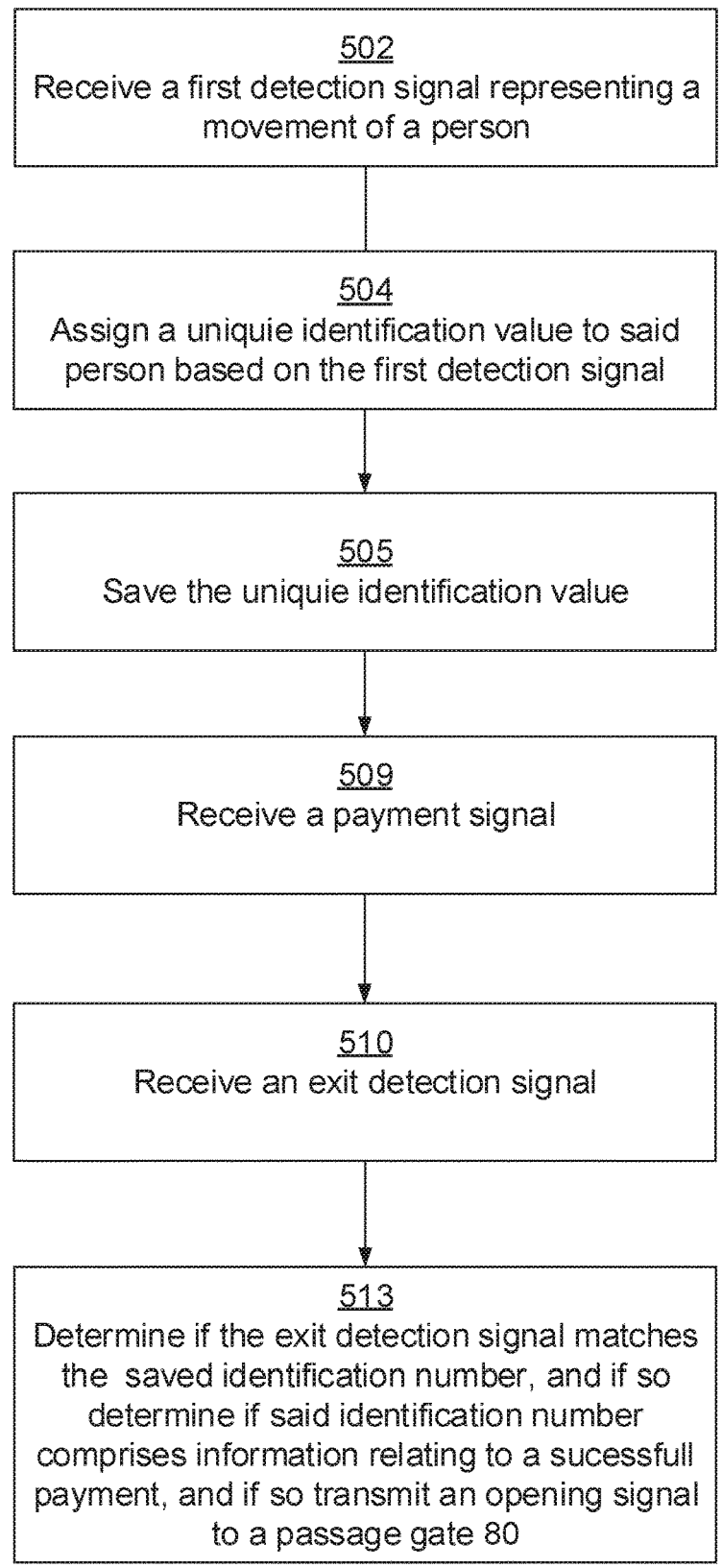

FIG. 6a-b illustrates two alternative methods that the sensor arrangement 120 is configured to perform in order to determine if a person is allowed to exit through the passage gate(s) 80. Starting with the method shown in FIG. 5a, the controller 130 receives 502 a first detection signal representing a detected person. The first detection signal is generated by the sensor 140 once the person enters the checkout area 110 or once the person is proximate to a point-of-sale system 70. Since the sensor arrangement 120 is continuously tracking the person, the first detection signal is a part of the continuously tracking of the person.

The controller 130 assigns 504 a unique identification value to that person based on the first detection signal. Such a value may for example be an image, a matrix of numbers or a vector of numbers. In one embodiment the unique identification value comprises three coordinates, one x-component, one y-component and one z-component. The z-component may represent the height of the person. In a preferred embodiment, the unique identification value is not coupled to the identity of the person being tracked.

The identification value is used to easier differentiate one person from a plurality of persons arranged in the checkout area 110. The sensor arrangement 120 is configured to start following a person 1 as soon as it enters the checkout area 110, and the sensor 140 continues to follow the person through his/hers way from the entrance passage 112, to one of the point-of-sale system 70 and towards the exit area 116 and the passage gates 80. The sensor arrangement 120 could also start following the person 1 as soon as he/she reaches the point-of-sale system 70. In this way, if the person changes his/hers appearance by for example putting on a hat or removing a coat during his/hers way through the checkout area 110, the sensor arrangement 120 will detect the change.

The sensor arrangement 120 thus continually tracks the person through at least some parts of the checkout area 110 by assigning a unique identification value to the person. By assigning a unique identification value to the person, tracking of the person may be performed without identifying the identity of the person (i.e. without a high resolution image or the persons face, contact information, name etc.). Information such as height, color of clothing and similar features are sufficient to be able to assign an identification value and track the person through the checkout area 110.

Hence, in a preferred embodiment the tracking is performed using a sensor arrangement 120 that does not use for example facial recognition algorithms to identify the person. Identifying a person using facial recognition and similar identification methods may cause problems with personal integrity and storing of such information. Furthermore, methods using facial recognition requires complex and power consuming systems. The present invention, which tracks a person without identifying the identity of the person, thus eliminates problems around personal integrity and provides a less complex tracking system.

The controller 130 is further configured to receive 506 information related to a successful payment of the article. Once a successful payment is achieved in the point-of-sale system 70, a payment signal is transmitted to the controller 130 confirming that the payment is completed. In one embodiment, the payment signal is sent directly from the point-of-sale system 70 to the controller 130. In another embodiment, the signal is sent from the point-of-sale system 70 to the processor 43 of the classification device 40 and then sent from the processor 43 to the controller 130. The point-of-sale system 70 and the controller 130 thus have a direct or indirect communication. In a further embodiment the controller 130 is integrated in the processor 43 of the classification device 40.

Based on the received payment information the identification value is saved 508 in the memory 150 of the controller 130 once the controller 130 receives information that a successful payment is achieved by that person, i.e. that identification value. In that case, all identification values that are saved represent persons that have successfully paid for their article(s). The payment information is thus only indirectly saved.

The identification values may be saved in the memory 150 of the controller 130 for a predetermined period of time. The identification values may for example be deleted after the person (represented by the identification value) has passed through the passage gate 80, a predetermined time after such a passage has been done or the values may be deleted every night after closing the store where the checkout area is arranged.

The controller 130 is configured to receive 510 a second detection signal when the person 1 enters the exit area 1168. The sensor 140 thus transmits a second detection signal to the controller 130 signalizing that the person 1 wants to exit through the passage gates 80. Since the sensor arrangement 120 is continuously tracking the person, the second detection signal is part of the continuously tracking of the person.

Based on the received second detection signal and the unique identification value the controller 130 determines 512 if the passage gate 80 should be opened or not. This is determined by examining if the second detection signal matches any of the saved identification values. If the second detection signal matches one of the saved identification numbers, the controller 130 transmits an opening signal to the passage gate 80. If there are several passage gates 80 in the exit area 116, the gate 80 being the most proximate to the person 1 is the one which is opened. If the controller 130 determines that the passage gate 80 should be opened, an opening signal is transmitted by the communication interface 160 of the controller 130 to the passage gate 80. Preferably the signal is wirelessly transmitted, but may also be transmitted using wires arranged from the sensor arrangement 120 and the passage gate 80. Once the passage gate receives the opening signal, the drive unit of the passage gate 80 is activated so as to open the gate.

In an alternative embodiment the method differs from the one presented with reference to FIG. 6a in that the sensor arrangement 120 does not receive a first detection signal representing a detected person once the person enters the checkout area 110. Instead, the detection signal is received once the payment signal has been received and the person is close to the point-of-sale system 70 where the payment has been performed. Hence, the controller 130 of the sensor arrangement 120 is configured to receive information related to a successful payment of the article, receive a first detection signal representing a detected person near the point-of-sale system 70 and assign a unique identification value to that person based on the first detection signal.

Yet an another alternative embodiment is shown in FIG. 6b, illustrating a method that the sensor arrangement 120 is configured to perform. The method differs from the one presented with reference to FIG. 6a in that the identification value is saved 505 as soon as it has been assigned and how the determination 513 process of the opening of the gate is performed.

The identification value is saved 505 as soon as it has been assigned. Once a payment signal is received that information is added to that specific identification value, so that the identification value comprises both information from the sensor 1430 as well as information regarding the payment. The payment information may be information just indicating "paid" or "not paid" or contain detailed information about the payment such as total amount, payment method, article identities and so on.

The controller 130 determines 513 that one passage gate 80 should be opened by examining if the second detection signal matches any of the saved identification values, and if so examining if the found identification value has information relating to a successful payment. If it is found that the identification value represents a person that has paid for its article(s), the controller 130 sends an opening signal to open the passage gate 80.

Furthermore, the control unit 130 may be configured to generate statistical information which may be useful for the store owner. The controller 130 may for example be configured to determine the average time a person is using the point-of-sale system 70 in order to complete a transaction, the average time it takes for a person to walk from the point-of-sale system 70 to the passage gate(s) 80, the amount of non-paying costumer leaving the store and how many persons that tries to enter the store using the passage gates 80 using the information generated from the checkout system.

The controller 130 may further be configured with different safety functions. For example, the controller 130 may be configured to detect if more than one person leaves through the gate 80 at the same time and in response to that transmit an alarm signal. This may be the case where one person tries to avoid paying for his/hers article(s) and moves directly behind a paying costumer. The alarm signal may be sent to a store clerk or other authorized personnel, to a mobile unit such as a tablet or a mobile phone arranged in the exit area 116 displaying information, or as a visual or audible alarm arranged in conjunction to the exit.

If the sensor arrangement 120 for some reason does not recognize a paying costumer and does not open a passage gate 80 some sort of backup system is beneficial. The sensor arrangement 120 may have problems of detecting and/or recognizing a paying costumer if several persons are shopping together but only one person is paying or if a paying customer changes its appearance during the time in the checkout area 110, for example by removing a jacket or a hat. One such backup system may be to have a store clerk may manually open the passage gate 80 by for example pressing a button arranged in the checkout area. Another backup system may comprise a manual scanning station which is used if the sensor arrangement 120 fails to detect or recognize the paying costumer. In that case, the costumer scans its receipt at the passage gate, the self-checkout system processes the signal and if the receipt is valid, an opening signal is sent to the passage gate so that the person is allowed to pass through the gate. The two backup systems described could preferably be combined so that either the store clerk or the costumer, using his/her receipt, is able to open the passage gate.

It should be appreciated that even though numerous characteristics and advantages of the present invention have been set forth in the foregoing description, together with details of the structure and function of the invention, the description is only illustrative and changes may be made in detail, especially in matters of shape, size and arrangement of parts within the scope of the invention to the full extent indicated by the appended claims.

The invention claimed is:

1. A self-checkout system for controlling an exit, comprising at least one passage gate, of a checkout area, said system comprising a sensor arrangement comprising at least one sensor, wherein the sensor arrangement is configured to:
   continuously track, by the at least one sensor, a person being inside the checkout area, wherein the tracking is performed without identifying the identity of the person, by assigning an unique identification value to said person, wherein the unique identification value is not coupled to the identity of the person being tracked;

receive a payment signal confirming a successful payment of at least one article by a person;

receive an exit detection signal from the at least one sensor representing that a person is at a predetermined distance from the exit in the checkout area; and determine if the person, that is at a predetermined distance from the exit, is allowed to exit the checkout area by:

determining if the exit detection signal and the payment signal correspond to the same person, and if so transmit an opening signal to said at least one passage gate at the exit so as to open the gate and allow said person to exit the area.

2. The self-checkout system according to claim 1, wherein the sensor arrangement further is configured to, prior to the step of receiving a payment signal:

receive a first detection signal from the at least one sensor representing the detected person entering the checkout area; and assign a unique identification value to said person based on the first detection signal.

3. The self-checkout system according to claim 1, wherein the sensor arrangement further is configured to, after the step of receiving a payment signal:

receive a first detection signal from the at least one sensor representing the detected person entering the checkout area; and assign a unique identification value to said person based on the first detection signal.

4. The self-checkout system according to claim 2, wherein the step of determining if the exit detection signal and the payment signal correspond to the same person is performed by determining if the exit detection signal matches the unique identification value.

5. The self-checkout system according to claim 1, wherein the unique identification value is saved once the payment signal is received.

6. The self-checkout system according to claim 1, wherein the unique identification value is saved once it is assigned, wherein the unique identification value is updated with the payment information contained in said payment signal once a payment signal is received.

7. The self-checkout system according to claim 1, wherein the sensor arrangement further comprises a controller.

8. The self-checkout system according to claim 1, wherein the at least one sensor is a camera.

9. The self-checkout system according to claim 1, wherein the system further comprises a point-of-sale system for completing a transaction based on identified articles and for transmitting a payment signal to the sensor arrangement.

10. A method for controlling an exit of a checkout area, wherein the exit comprises at least one passage gate, the method comprising the steps of:

continuously tracking a person being inside the checkout area with at least one sensor of a sensor arrangement, wherein the tracking is performed without identifying the identity of the person by assigning an unique identification value to said person, wherein the unique identification value is not coupled to the identity of the person being tracked;

completing a payment transaction for at least one article of the person;

detecting that said person is at a predetermined distance from the exit with the at least one sensor; and determining if the person, that is at a predetermined distance from the exit, is allowed to exit the checkout area by:

determining if the person that completed the payment transaction is the same person that was detected at a predetermined distance from the exit, and if so opening the at least one passage gate at the exit to allow said person to exit.

11. The method according to claim 10, wherein the method further comprises the steps of, prior to the step of completing a payment transaction:

detecting a person entering the checkout area with the at least one sensor; and assigning a unique identification value to said person.

12. The method according to claim 10, wherein the method further comprises the steps of, after the step of completing a payment transaction:

detecting a person entering the checkout area with the at least one sensor; and assigning a unique identification value to said person.

13. The method according to claim 10, wherein the step of determining if the person that completed the payment transaction is the same person that was detected at a predetermined distance from the exit is performed by determining if the unique identification value refers to the person detected at a predetermined distance from the exit.

* * * * *